(12) United States Patent
Yu

(10) Patent No.: US 10,958,822 B2
(45) Date of Patent: Mar. 23, 2021

(54) AUTOFOCUS INITIALIZATION BASED ON TARGET DETECTION

(71) Applicant: SZ DJI TECHNOLOGY CO., LTD., Shenzhen (CN)

(72) Inventor: Lifu Yu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 13 days.

(21) Appl. No.: 16/184,660

(22) Filed: Nov. 8, 2018

(65) Prior Publication Data

US 2019/0082113 A1 Mar. 14, 2019

Related U.S. Application Data

(63) Continuation of application No. PCT/CN2016/082689, filed on May 19, 2016.

(51) Int. Cl.
*H04N 7/18* (2006.01)
*H04N 5/232* (2006.01)
(Continued)

(52) U.S. Cl.
CPC ..... *H04N 5/232121* (2018.08); *B64C 39/024* (2013.01); *G02B 7/28* (2013.01);
(Continued)

(58) Field of Classification Search
CPC ........ B64C 2201/027; B64C 2201/127; B64C 39/024; G02B 7/28; G03B 13/20;
(Continued)

(56) References Cited

U.S. PATENT DOCUMENTS 10,121,080 B2 * 11/2018 Script ............... G06K 9/00771
10,269,257 B1 * 4/2019 Gohl .................... H04N 13/128
(Continued)

FOREIGN PATENT DOCUMENTS

CN 101329494 A 12/2008
CN 101344460 A 1/2009
(Continued)

OTHER PUBLICATIONS

The World Intellectual Property Organization (WIPO) International Search Report and Written Opinion for PCT/CN2016/082689 dated Feb. 28, 2017 8 pages.

*Primary Examiner* — Gims S Philippe
(74) *Attorney, Agent, or Firm* — Anova Law Group, PLLC

(57) ABSTRACT

A method for moving an optical device of an imaging device includes one or more depth sensors acquiring one or more depth measurements within a predefined spatial coordinate system. Each of the one or more depth measurements indicates a distance from the imaging device to an object within the predefined spatial coordinate system. The method further includes one or more orientation sensors determining orientation information of the imaging device within the predefined spatial coordinate system, estimating an object distance between the imaging device and the object based on the one or more depth measurements and the orientation information, and moving the optical device from a first position to a second position according to the object distance and a focal length of the optical device.

14 Claims, 12 Drawing Sheets

(51) Int. Cl.
*G02B 7/28* (2021.01)
*G03B 13/36* (2021.01)
*G03B 13/20* (2021.01)
*G03B 15/00* (2021.01)
*B64C 39/02* (2006.01)

(52) U.S. Cl.
CPC ............ *G03B 13/20* (2013.01); *G03B 13/36* (2013.01); *G03B 15/006* (2013.01); *H04N 5/232123* (2018.08); *H04N 7/185* (2013.01); *B64C 2201/027* (2013.01); *B64C 2201/127* (2013.01)

(58) Field of Classification Search
CPC .................. G03B 15/006; G03B 13/36; H04N 5/232121; H04N 5/232123; H04N 7/185
USPC ........................................................ 348/144
See application file for complete search history.

(56) References Cited

U.S. PATENT DOCUMENTS

| | | | |
|---|---|---|---|
| 2008/0007626 | A1* | 1/2008 | Wernersson ....... H04N 5/23212 348/211.9 |
| 2008/0317453 | A1 | 12/2008 | Yuyama |
| 2015/0049172 | A1* | 2/2015 | Ramachandra ........... G06T 7/85 348/47 |
| 2015/0264337 | A1* | 9/2015 | Venkataraman .......... G01P 3/38 348/47 |
| 2016/0076892 | A1 | 3/2016 | Zhou et al. |
| 2016/0131867 | A1 | 5/2016 | Greene et al. |
| 2016/0156823 | A1* | 6/2016 | Yoshida ................. H04N 5/772 348/143 |
| 2017/0148168 | A1* | 5/2017 | Lindner ................ G06T 7/0002 |
| 2018/0031372 | A1* | 2/2018 | Gill ........................ G01C 3/14 |

FOREIGN PATENT DOCUMENTS

| | | |
|---|---|---|
| CN | 102809969 A | 12/2012 |
| CN | 105335959 A | 2/2016 |
| WO | 2015143615 A1 | 10/2015 |

* cited by examiner

900

902
Acquire, by one or more depth sensors, a set of depth measurements within a predefined spatial coordinate system, wherein a respective depth measurement of the set of depth measurements indicates a distance from the imaging device to an object

904
Determine, by the one or more orientation sensors, orientation information of the imaging device within the predefined spatial coordinate system

906
Estimate an object distance between the imaging device and the object based on the set of depth measurements and the orientation information

908
Move the optical device from a first position to a second position according to the determined image distance

912
The one or more depth sensors include: a first depth sensor that has a first orientation along a first axis; a second depth sensor that has a second orientation along a second axis that is orthogonal to the first axis; and a third depth sensor that has a third orientation along a third axis that is orthogonal to the first axis and the second axis

914
Estimating the object distance between the imaging device and the object includes: determining, using the orientation information, a first angle between a center axis of the optical device and a first axis of the spatial coordinate system; determining, using the orientation information, a second angle, wherein the second angle is an angle between: the center axis of the optical device as projected onto a plane defined by a second axis and a third axis of the spatial coordinate system, and the second axis of the spatial coordinate system; and estimating the object distance based on the first angle, the second angle, and the set of depth measurements.

916
After moving the optical device to the second position, move the optical device from the second position to a third position according to an autofocus operation

918
The autofocus operation is a contrast autofocus operation

920
The one or more depth sensors include at least one pressure sensor

922
The at least one pressure sensor is an ultrasonic sensor

924
The one or more orientation sensors include at least one accelerometer

926
Generate, by a signal generator, a signal

928
Detect a reflection of the signal by the one or more depth sensors

AUTOFOCUS INITIALIZATION BASED ON TARGET DETECTION

CROSS-REFERENCE TO RELATED APPLICATION

This application is a continuation of International Application No. PCT/CN2016/082689, filed on May 19, 2016, the entire contents of which are incorporated herein by reference.

TECHNICAL FIELD

The disclosed embodiments relate generally to focusing an image and more particularly, but not exclusively, to adjusting a position of an optical device within an imaging device based on the position of an object to be imaged.

BACKGROUND

A movable object, such as an unmanned aerial vehicle (UAV), is often equipped with various types of sensors. For example, a UAV may use depth sensors for, e.g., obstacle avoidance and/or target detection. An orientation sensor affixed to a UAV may be used for, e.g., imaging and/or flight control purposes. A movable object may include an imaging device, such as a camera, that captures images as the movable object s operated. Autofocus techniques are widely used across a range of cameras for adjusting the optical system of the device to provide focused image output. Because a UAV is often in motion relative to an image subject, a rapid autofocus process is particularly beneficial for a camera coupled to a UAV.

SUMMARY

There is a need for systems and methods for using movable object sensor data to initialize a distance of an optical device relative to an image sensor. Such systems and methods optionally complement or replace conventional methods for moving an optical device to an initial position relative to an image sensor. A carefully chosen initial position of the optical device according to some embodiments of the present application can significantly reduce the time it takes for focusing an imaging device including the optical device on a desired target and taking pictures of the target. This feature is very important when the imaging device is borne on a movable object such as a UAV, a robot, a vehicle, etc.

In accordance with some embodiments, a method for moving an optical device relative to an image sensor within an imaging device comprises: acquiring, by one or more depth sensors, a set of depth measurements within a predefined spatial coordinate system. A respective depth measurement of the set of depth measurements indicates a distance from the imaging device to an object. One or more orientation sensors determine orientation information of the imaging device within the predefined coordinate system. The method further comprises estimating an object distance between the imaging device and the object based on the set of depth measurements and the orientation information and moving the optical device from a first position to a second position according to the estimated object distance between the imaging device and the object and a focal length of the optical device. In some embodiments, an image distance is determined based on the estimated object distance and the focal length of the optical device. The optical device moves from a first position to a second position according to the determined image distance.

In accordance with some embodiments, an unmanned aerial vehicle (UAV) comprises a propulsion system, one or more depth sensors, one or more orientation sensors, an imaging device comprising an image sensor and an optical device, and one or more processors coupled to the propulsion system, the one or more depth sensors, the one or more orientation sensors, and the imaging device. The one or more processors are configured for: acquiring, by the one or more depth sensors, a set of depth measurements within a predefined spatial coordinate system A respective depth measurement of the set of depth measurements indicates a distance from the imaging device to an object. The one or more orientation sensors determine orientation information of the imaging device within the predefined coordinate system. The one or more processors are further configured for estimating an object distance between the imaging device and the object based on the set of depth measurements and the orientation information and moving the optical device from a first position to a second position according to the estimated object distance between the imaging device and the object and a focal length of the optical device. In some embodiments, an image distance is determined based on the estimated object distance and the focal length of the optical device. The optical device moves from a first position to a second position according to the determined image distance.

In accordance with some embodiments, a system for moving an optical device relative to an image sensor within an imaging device comprises one or more depth sensors, one or more orientation sensors, an imaging device comprising an image sensor and an optical device, and one or more processors coupled to the one or more depth sensors, the one or more orientation sensors, and the imaging device. The one or more processors are configured for: acquiring, by the one or more depth sensors, a set of depth measurements within a predefined spatial coordinate system. A respective depth measurement of the set of depth measurements indicates a distance from the imaging device to an object. The one or more orientation sensors determine orientation information of the imaging device within the predefined coordinate system. The one or more processors are further configured for estimating an object distance between the imaging device and the object based on the set of depth measurements and the orientation information and moving the optical device from a first position to a second position according to the estimated object distance between the imaging device and the object and a focal length of the optical device. In some embodiments, an image distance is determined based on the estimated object distance and the focal length of the optical device. The optical device moves from a first position to a second position according to the determined image distance.

In accordance with some embodiments, a computer readable storage medium stores one or more programs, the one or more programs comprising instructions, which when executed, cause a device to: acquire, by the one or more depth sensors, a set of depth measurements within a predefined spatial coordinate system. A respective depth measurement of the set of depth measurements indicates a distance from the imaging device to an object. The one or more orientation sensors determine orientation information of the imaging device within the predefined coordinate system. The one or more programs further comprise instructions, which when executed, cause the device to estimate an object distance between the imaging device and the object based on the set of depth measurements and the orientation information and move the optical device from a first position to a second position according to the estimated object distance between the imaging device and the object and a focal length of the optical device. In some embodiments, an image distance is determined based on the estimated object distance and the focal length of the optical device. The optical device moves from a first position to a second position according to the determined image distance.

BRIEF DESCRIPTION OF THE DRAWINGS

FIGS. 9A-9C are a flow diagram illustrating a method for moving an optical device relative to an image sensor, in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The following description uses an unmanned aerial vehicle (UAV) as an example of a movable object. UAVs include, e.g., fixed-wing aircrafts and rotary-wing aircrafts such as helicopters, quadcopters, and aircraft having other numbers and/or configurations of rotors. It will be apparent to those skilled in the art that other types of movable objects may be substituted for UAVs as described below.

Techniques related to optical adjustments for movable objects such as UAVs are described herein. A UAV or other device equipped with sensors to provide depth measurement data and/or orientation data can leverage sensor data to quickly determine an initial position for an optical device relative to an image sensor in an imaging device, increasing the speed with which imaging device focus is achieved.

Figure 1:
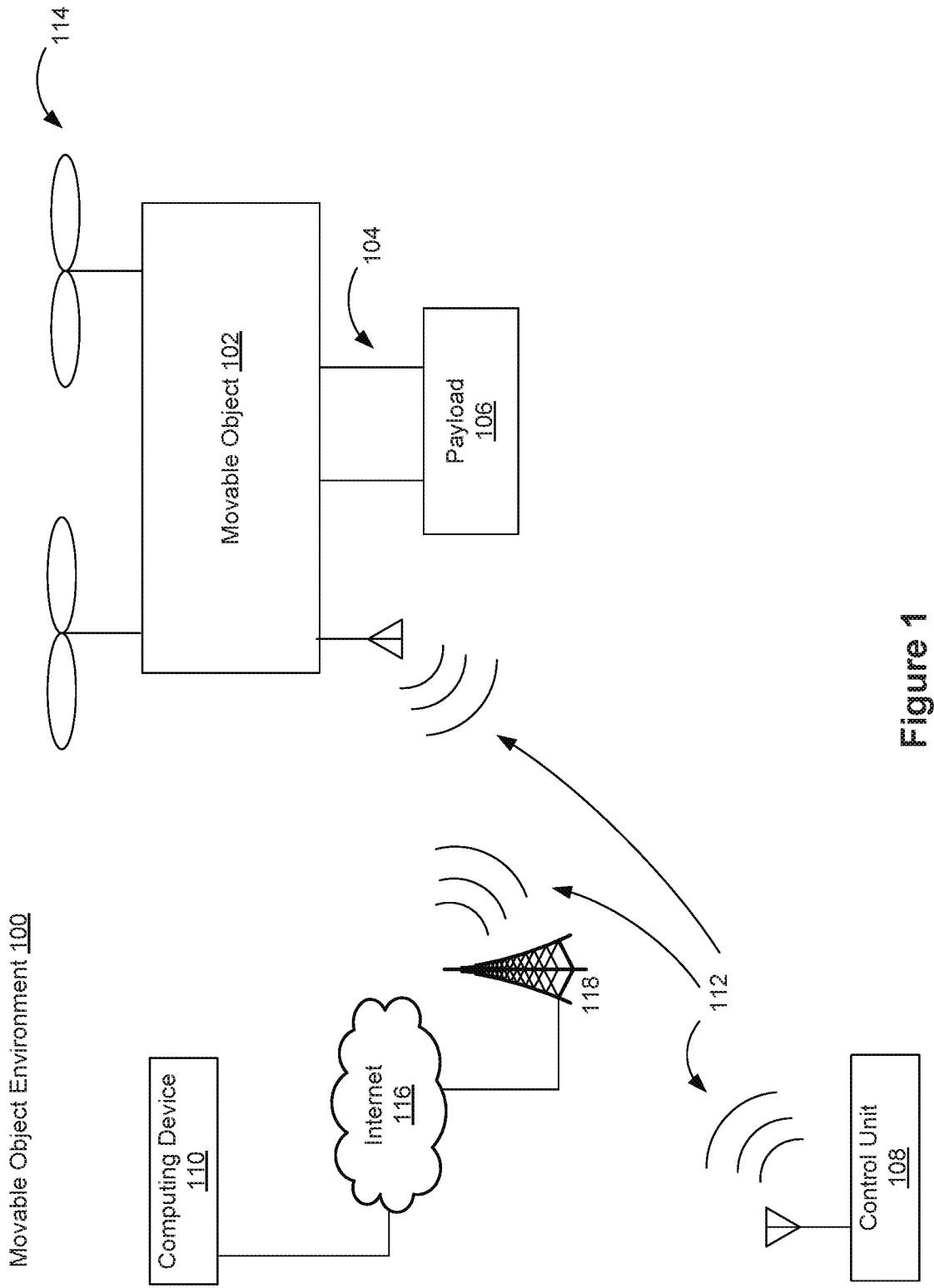
FIG. 1 illustrates a movable object environment, in accordance with some embodiments.

FIG. 1 illustrates a movable object environment 100, in accordance with some embodiments. The movable object environment 100 includes a movable object 102. In some embodiments, the movable object 102 includes a carrier 104 and/or a payload 106.

In some embodiments, the carrier 104 is used to couple the payload 106 to the movable object 102. In some embodiments, the carrier 104 includes an element (e.g., a gimbal and/or damping element) to isolate the payload 106 from movement of the movable object 102 and/or the movement mechanism 114. In some embodiments, the carrier 104 includes an element for controlling movement of the payload 106 relative to the movable object 102.

In some embodiments, the payload 106 is coupled (e.g., rigidly coupled) to the movable object 102 (e.g., coupled via carrier 104) such that the payload 106 remains substantially stationary relative to movable object 102. For example, the carrier 104 is coupled to the payload 106 such that the payload is not movable relative to the movable object 102. In some embodiments, the payload 106 is mounted directly to the movable object 102 without requiring the carrier 104. In some embodiments, the payload 106 is located partially or fully within the movable object 102.

In some embodiments, a control unit 108 communicates with the movable object 102, e.g., to provide control instructions to the movable object 102 and/or to display information received from the movable object 102. Although the control unit 108 is typically a portable (e.g., handheld) device, the control unit 108 need not be portable. In some embodiments, the control unit 108 is a dedicated control device (e.g., for the movable object 102), a laptop computer, a desktop computer, a tablet computer, a gaming system, a wearable device (e.g., glasses, a glove, and/or a helmet), a microphone, a portable communication device (e.g., a mobile telephone) and/or a combination thereof.

In some embodiments, an input device of the control unit 108 receives user input to control aspects of the movable object 102, the carrier 104, the payload 106, and/or a component thereof. Such aspects include, e.g., orientation, position, orientation, velocity, acceleration, navigation, and/or tracking. For example, a position of an input device of the control unit 108 (e.g., a position of a component of the input device) is manually set by a user to a position corresponding to an input (e.g., a predetermined input) for controlling the movable object 102. In some embodiments, the input device is manipulated by a user to input control instructions for controlling the navigation of the movable object 102. In some embodiments, an input device of control unit 108 is used to input a flight mode for the movable object 102, such as auto pilot or navigation according to a predetermined navigation path.

In some embodiments, a display of the control unit 108 displays information generated by the movable object sensing system 210, the memory 204, and/or another system the movable object 102. For example, the display displays information about the movable object 102, the carrier 104, and/or the payload 106, such as position, orientation, orientation, movement characteristics of the movable object 102, and/or distance between the movable object 102 and another object (e.g., a target and/or an obstacle). In some embodiments, information displayed by a display of control unit 108 includes images captured by an imaging device 302 (FIG. 3), tracking data graphical tracking indicator applied to a representation of a target), and/or indications of control data transmitted to the movable object 102. In some embodiments, information displayed by the display of the control unit 108 is displayed in substantially real-time as information is received from the movable object 102 and/or as image data is acquired. In some embodiments, the display of the control unit 108 is a touchscreen display.

In some embodiments, the movable object environment 100 includes a computing device 110. The computing device 110 is, e.g., a server computer, a cloud server, a desktop computer, a laptop computer, a tablet, or another portable electronic device (e.g., a mobile telephone). In some embodiments, the computing device 110 is a base station that communicates (e.g., wirelessly) with the movable object 102 and/or the control unit 108. In some embodiments, the computing device 110 provides data storage, data retrieval, and/or data processing operations, e.g., to reduce the processing power and/or data storage requirements of the movable object 102 and/or the control unit 108. For example, the computing device 110 is communicatively connected to a database and/or the computing device 110 includes a database. In some embodiments, the computing device 110 is used in lieu of or in addition to the control unit 108 to perform any of the operations described with regard to the control unit 108.

In some embodiments, the movable object 102 communicates with a control unit 108 and/or a computing device 110, e.g., via wireless communications 112. In some embodiments, the movable object 102 receives information from the control unit 108 and/or the computing device 110. For example, information received by the movable object 102 includes, e.g., control instructions for controlling movable object 102. In some embodiments, the movable object 102 transmits information to the control unit 108 and/or the computing device 110. For example, information transmitted by the movable object 102 includes, e.g., images and/or video captured by the movable object 102.

In some embodiments, communications between the computing device 110, the control unit 108 and/or the movable object 102 are transmitted via a network (e.g., Internet 116) and/or a wireless signal transmitter (e.g., a long range wireless signal transmitter) such as a cellular tower 118. In some embodiments, a satellite (not shown) is a component of Internet 116 and/or is used in addition to or in lieu of the cellular tower 118.

In some embodiments, information communicated between the computing device 110, the control unit 108 and/or the movable object 102 include control instructions. Control instructions include, e.g., navigation instructions for controlling navigational parameters of the movable object 102 such as position, orientation, orientation, and/or one or more movement characteristics of the movable object 102, the carrier 104, and/or the payload 106. In some embodiments, control instructions include instructions directing movement of one or more of the movement mechanisms 114. For example, control instructions are used to control flight of a UAV.

In some embodiments, control instructions include information for controlling operations (e.g., movement) of the carrier 104. For example, control instructions are used to control an actuation mechanism of the carrier 104 so as to cause angular and/or linear movement of the payload 106 relative to the movable object 102. In some embodiments, control instructions adjust movement of the carrier 104 relative to the movable object 102 with up to six degrees of freedom.

In some embodiments, control instructions are used to adjust one or more operational parameters for the payload 106. For example, control instructions include instructions for adjusting an optical parameter (e.g., an optical parameter of the imaging device 302). In some embodiments, control instructions include instructions for adjusting imaging properties and/or image device functions, such as adjusting a distance between an image sensor 304 and an optical device 306 (FIG. 3), capturing an image, initiating/ceasing video capture, powering an imaging device 302 on or off, adjusting an imaging mode (e.g., capturing still images or capturing video), adjusting a distance between left and right components of a stereographic imaging system, and/or adjusting a position, orientation, and/or movement (e.g., pan rate, pan distance) of a carrier 104, a payload 106 and/or an imaging device 302.

In some embodiments, when control instructions are received by movable object 102, the control instructions change parameters of and/or are stored by memory 204 (FIG. 2) of movable object 102.

Figure 2:
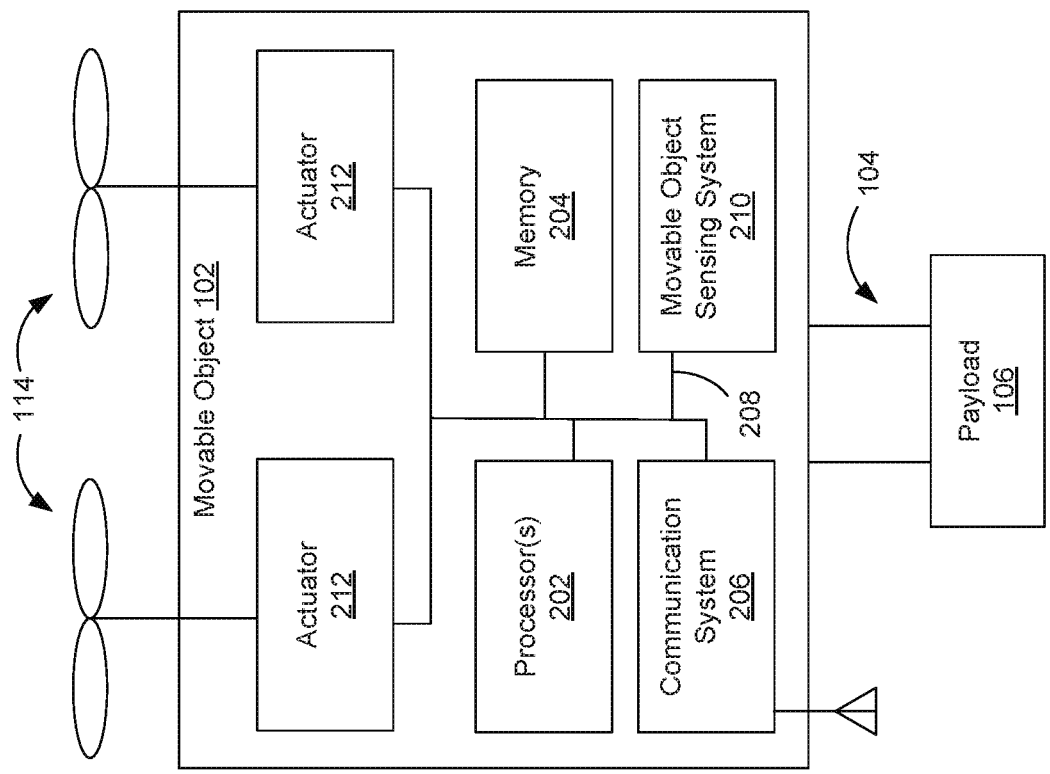
FIG. 2 illustrates a movable object, in accordance with some embodiments.

FIG. 2 illustrates an exemplary movable object 102, in accordance with some embodiments. The movable object 102 typically includes one or more processor(s) 202, a memory 204, a communication system 206, a movable object sensing system 210, and one or more communication buses 208 for interconnecting these components.

In some embodiments, the movable object 102 is a UAV and includes components to enable flight and/or flight control. In some embodiments, the movable object 102 includes communication system 206 with one or more network or other communications interfaces (e.g., via which flight control instructions are received), one or more movement mechanisms 114, and/or one or more movable object actuators 212 (e.g., to cause movement of movement mechanisms 114 in response to received control instructions). Although the movable object 102 is depicted as an aircraft, this depiction is not intended to be limiting, and any suitable type of movable object can be used.

In some embodiments, the movable object 102 includes movement mechanisms 114 (e.g., propulsion mechanisms). Although the plural term "movement mechanisms" is used herein for convenience of reference, "movement mechanisms 114" refers to a single movement mechanism (e.g., a single propeller) or multiple movement mechanisms (e.g., multiple rotors) The movement mechanisms 114 include one or more movement mechanism types such as rotors, propellers, blades, engines, motors, wheels, axles, magnets, nozzles, and so on. The movement mechanisms 114 are coupled to the movable object 102 at, e.g., the top, bottom, front, back, and/or sides. In some embodiments, the movement mechanisms 114 of a single movable object 102 include multiple movement mechanisms of the same type. In some embodiments, the movement mechanisms 114 of a single movable object 102 include multiple movement mechanisms with different movement mechanism types. The movement mechanisms 114 are coupled to the movable object 102 using any suitable means, such as support elements e.g., drive shafts) and/or other actuating elements (e.g., the movable object actuators 212). For example, a movable object actuator 212 receives control signals from the processor(s) 202 (e.g., via the control bus 208) that activates the movable object actuator 212 to cause movement of a movement mechanism 114. For example, the processor(s) 202 include an electronic speed controller that provides control signals to a movable object actuator 212.

In some embodiments, the movement mechanisms 114 enable the movable object 102 to take off vertically from a surface or land vertically on a surface without requiring any horizontal movement of the movable object 102 (e.g., without traveling down a runway). In some embodiments, the movement mechanisms 114 are operable to permit the movable object 102 to hover in the air at a specified position and/or orientation. In some embodiments, one or more of the movement mechanisms 114 are controllable independently of one or more of the other movement mechanisms 114. For example, when the movable object 102 is a quadcopter, each rotor of the quadcopter is controllable independently of the other rotors of the quadcopter. In some embodiments, multiple movement mechanisms 114 are configured for simultaneous movement.

In some embodiments, the movement mechanisms 114 include multiple rotors that provide lift and/or thrust to the movable object 102. The multiple rotors are actuated to provide, e.g., vertical takeoff, vertical landing, and hovering capabilities to the movable object 102. In some embodiments, one or more of the rotors spin in a clockwise direction, while one or more of the rotors spin in a counterclockwise direction. For example, the number of clockwise rotors is equal to the number of counterclockwise rotors. In some embodiments, the rotation rate of each of the rotors is independently variable, e.g., for controlling the lift and/or thrust produced by each rotor, and thereby adjusting the spatial disposition, velocity, and/or acceleration of the movable object 102 (e.g., with respect to up to three degrees of translation and/or up to three degrees of rotation).

In some embodiments, the memory 204 stores one or more instructions, programs (e.g., sets of instructions), modules, controlling systems and/or data structures, collectively referred to as "elements" herein. One or more elements described with regard to the memory 204 are optionally stored by the control unit 108, the computing device 110, and/or another device. In some embodiments, imaging device 302 includes memory that stores one or more parameters described with regard to the memory 204.

In some embodiments, the memory 204 stores a controlling system configuration that includes one or more system settings (e.g., as configured by a manufacturer, administrator, and/or user). For example, identifying information for the movable object 102 is stored as a system setting of the system configuration. In some embodiments, the controlling system configuration includes a configuration for the imaging device 302. The configuration for the imaging device 302 stores parameters such as position (e.g., of the optical device 306 relative to the image sensor 304), zoom level and/or focus parameters (e.g., amount of focus, selecting autofocus or manual focus, and/or adjusting an autofocus target in an image). Imaging property parameters stored by the imaging device configuration include, e.g., image resolution, image size (e.g., image width and/or height), aspect ratio, pixel count, quality, focus distance, depth of field, exposure time, shutter speed, and/or white balance. In some embodiments, parameters stored by the imaging device configuration are updated in response to control instructions (e.g., generated by processor(s) 202 and/or received by the movable object 102 from control unit 108 and/or the computing device 110). In some embodiments, parameters stored by the imaging device configuration are updated in response to information received from the movable object sensing system 210 and/or the imaging device 302.

In some embodiments, a controlling system performs imaging device adjustment. The imaging device adjustment module stores, e.g., instructions for adjusting a distance between an image sensor 304 and an optical device 306 of an imaging device 302, e.g., instructions for controlling imaging device actuator 308. In some embodiments, one or more instructions for performing imaging device adjustment are stored in the memory 204.

In some embodiments, the controlling system performs an autofocus operation. For example, the autofocus operation is performed, e.g., periodically, when a device determines from image analysis that a focus level has fallen below a focus level threshold, in response a determination that movable object 102 and/or an image subject (e.g., a target or a remote object) has moved by more than a threshold distance, and/or in response to user input. In some embodiments, user input (e.g., received at control unit 108 and/or computing device 110) initiates and/or adjusts an autofocus mode. In some embodiments, user input indicates one or more regions (e.g., in an image captured by imaging device 302, such as an image displayed by control unit 108 and/or computing device 110) to be used and/or prioritized for an autofocus operation. In some embodiments, the autofocus module generates control instructions for moving an optical device 306 relative to an image sensor 304 in accordance with an image distance value determined by an image distance determination module. In some embodiments, one or more instructions for performing an autofocus operation are stored in the memory 204.

In some embodiments, the controlling system performs image distance determination, e.g., to determine an object distance and/or an image distance in accordance with the operations described herein. For example, the image distance determination module uses sensor data from one or more depth sensors and one or more orientation sensors of a movable object to determine an image distance and generate a control instruction for moving an optical device 306 relative to an image sensor 304 in accordance with the determined image distance. In some embodiments, one or more instructions for performing image distance determination are stored in the memory 204.

The above identified controlling system, modules, and/or programs (e.g., sets of instructions) need not be implemented as separate software programs, procedures or modules, and thus various subsets of these modules may be combined or otherwise re-arranged in various embodiments, and stored in the memory 204. In some embodiments, the controlling system includes a subset of the modules and data structures identified above. Furthermore, the memory 204 may store additional modules and data structures not described above. In some embodiments, the programs, modules, and data structures stored in the memory 204, or a non-transitory computer readable storage medium of memory 204, provide instructions for implementing respective operations in the methods described below. In some embodiments, some or all of these modules may be implemented with specialized hardware circuits that subsume part or all of the module functionality. One or more of the above identified elements may be executed by one or more processors 202 of the movable object 102. In some embodiments, one or more of the above identified modules are stored on one or more storage devices of a device remote from the movable object (such as memory of the control unit 108, the computing device 110, and/or the imaging device 302) and/or executed by one or more processors of a device remote from the movable object 102 (such as processor(s) of the control unit 108, the computing device 110, and/or the imaging device 302).

The communication system 206 enables communication with the control unit 108 and/or the computing device 110, e.g., via wireless signals 112. The communication system 206 includes, e.g., transmitters, receivers, and/or transceivers for wireless communication. In some embodiments, the communication is one-way communication, such that data is only received by the movable object 102 from the control unit 108 and/or the computing device 110, or vice-versa. In some embodiments, communication is two-way communication, such that data is transmitted in both directions between the movable object 102 and the control unit 108 and/or the computing device 110. In some embodiments, the movable object 102, the control unit 108, and/or the computing device 110 are connected to the Internet 116 or other telecommunications network, e.g., such that data generated by the movable object 102, the control unit 108, and/or the computing device 110 is transmitted to a server for data storage and/or data retrieval (e.g., for display by a website).

In some embodiments, the sensing system 210 of the movable object 102 includes one or more sensors. In some embodiments, one or more sensors of the movable object sensing system 210 are mounted to the exterior, located within, or otherwise coupled to the movable object 102. In some embodiments, one or more sensors of the movable object sensing system 210 are components of and/or coupled to the carrier 104, the payload 106, and/or the imaging device 302. Where sensing operations are described herein as being performed by the movable object sensing system 210, it will be recognized that such operations are optionally performed by one or more sensors of the carrier 104, the payload 106, and/or the imaging device 302 in addition to and/or in lieu of one or more sensors of the movable object sensing system 210.

Figure 3:
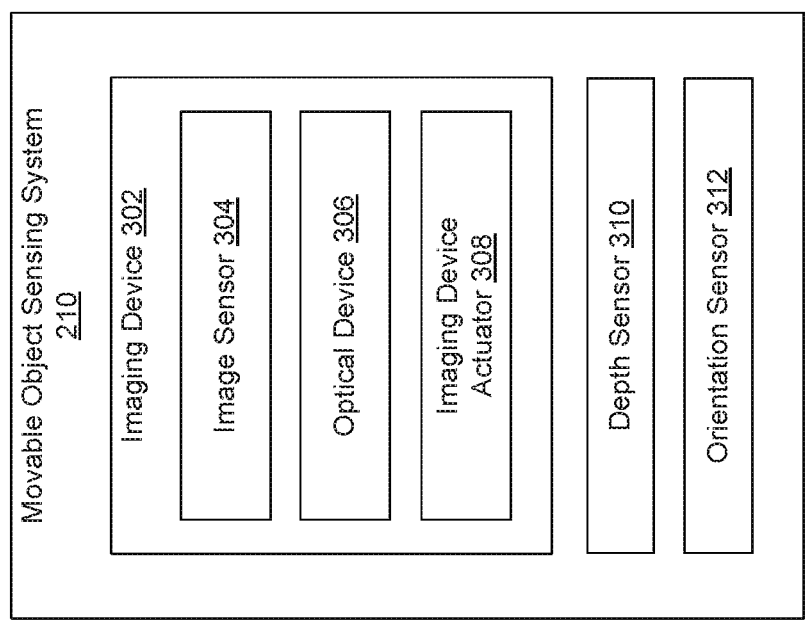
FIG. 3 illustrates a sensing system of the movable object, in accordance with some embodiments

FIG. 3 illustrates a sensing system 210 of the movable object 102, in accordance with some embodiments. The movable object sensing system 210 includes an imaging device 302, a depth sensor 310, and/or an orientation sensor 312.

The movable object sensing system 210 generates static sensing data (e.g., a single image captured in response to a received instruction) and/or dynamic sensing data (e.g., a series of images captured at a periodic rate, such as a video).

In some embodiments, the movable object sensing system 210 includes an imaging device 302 (e.g., a camera). In some embodiments, the imaging device 302 is the payload 106 or is a component of the payload 106. The imaging device 302 includes an image sensor 304 and an optical device 306. In some embodiments, optical device 306 and/or imaging device 302 are moved by an imaging device actuator 308.

In some embodiments, the movable object sensing system 10 includes multiple image sensors 304, optical devices 306, and/or imaging device actuators 308. For example, movable object 102 includes a pair of imaging devices 302 for stereographic imaging (e.g., a left imaging device and a right imaging device).

The image sensor 304 is, a sensor that detects light, such as visible light, infrared light, and/or ultraviolet light. In some embodiments, the image sensor 304 includes, e.g., semiconductor charge-coupled devices (CCD), active pixel sensors using complementary metal-oxide-semiconductor (CMOS) and/or N-type metal-oxide-semiconductors (NMOS, Live MOS).

The optical device 306 affects the focus of light that arrives at the image sensor 304. For example, the optical device 306 is a lens or a device including multiple lenses (e.g., a compound lens). A lens is, e.g., a material having curved surfaces that give rise to lens properties, such as causing light rays to converge (e.g., at a focal length) and/or diverge.

The imaging device actuator 308 is, e.g., a motor, such as a hydraulic, pneumatic, electric, thermal, magnetic, and/or mechanical motor. In some embodiments, imaging device actuator 308 translates an optical device 306 along one or more axes relative to the image sensor 304 of the imaging device 302. In some embodiments, the imaging device actuator 308 moves the optical device 306 in accordance with a signal sent by a processor (e.g., processor(s) 202).

In some embodiments, the movable object sensing system 210 includes one or more infrared sensors. In some embodiments, a distance measurement system for measuring a distance from the movable object 102 to an object or surface includes one or more infrared sensors, such a left infrared sensor and a right infrared sensor for stereoscopic imaging and/or distance determination.

In some embodiments, the movable object sensing system 210 includes one or more acoustic transducers. For example, an acoustic detection system includes an acoustic output transducer (e.g., a speaker) and/or an acoustic input transducer a microphone, such as a parabolic microphone). In some embodiments, microphone and a speaker are used as components of a sonar system. A sonar system is used, for example, to provide a three-dimensional map of the surroundings of the movable object 102. In some embodiments, one or more acoustic transducer is configured to receive and/or emit ultrasonic frequency waves.

In some embodiments, the depth sensor 310 includes, e.g., one or more pressure sensors (such as an acoustic transducer in the z-axis one or more infrared sensors, one or more ultrasonic sensors, one or more radar sensors, one or more stereo cameras, one or more time-of-flight (ToF) cameras, and/or one or more image sensors. For example, depth sensor 310 includes a pair of imaging devices 302 for stereographic imaging (e.g., a left imaging device and a right imaging device), a pair of infrared sensors for stereographic infrared imaging, and/or a pair of pressure sensors for stereo sonar sensing. The depth sensor 310 is used, e.g., to determine a distance from the movable object 102 to another object, such as a target, an obstacle, and/or terrain.

In some embodiments, the movable object sensing system 210 includes one or more global positioning system (GPS) sensors, motion sensors (e.g., accelerometers), inertial sensors (e.g., inertial measurement units (IMUs)), a compass system, one or more proximity sensors (e.g., infrared sensors) and/or weather sensors. The orientation of the moveable object 102 may be determined by the movable object sensing system 210. In some embodiments, the orientation sensor 312 includes an accelerometer, a magnetometer, one or more potentiometers, one or more Hall sensors, and/or a gyroscope, e.g., for detecting an orientation of the imaging device 302 and/or the movable object 102. In some embodiments, the orientation of the imaging device 302 is determined by an IMU built into a gimbal supporting the imaging device 302.

In some embodiments, sensing data generated by one or more sensors of the movable object sensing system 210 and/or information determined using sensing data from one or more sensors of the movable object sensing system 210 are transmitted to the control unit 108 and/or the computing device 110 (e.g., via the communication system 206). In some embodiments, data generated by one or more sensors of the movable object sensing system 210 and/or information determined using sensing data from one or more sensors of the movable object sensing system 210 is stored by the memory 204.

In some embodiments, the movable object 102, the control unit 108, and/or the computing device 110 use sensing data generated by sensors of the sensing system 210 to determine information such as a position of the movable object 102 (e.g., via output of the one or more GPS sensors), an orientation of the movable object 102 (e.g., via output of orientation sensor 312), movement characteristics of the movable object 102 (angular velocity, angular acceleration, translational velocity, translational acceleration and/or direction of motion along one or more axes), and/or proximity of the movable object 102 (e.g., via output of one or more depth sensors 310) to potential obstacles, image subjects, targets, weather conditions, locations of geographical features and/or locations of manmade structures.

Figure 4:
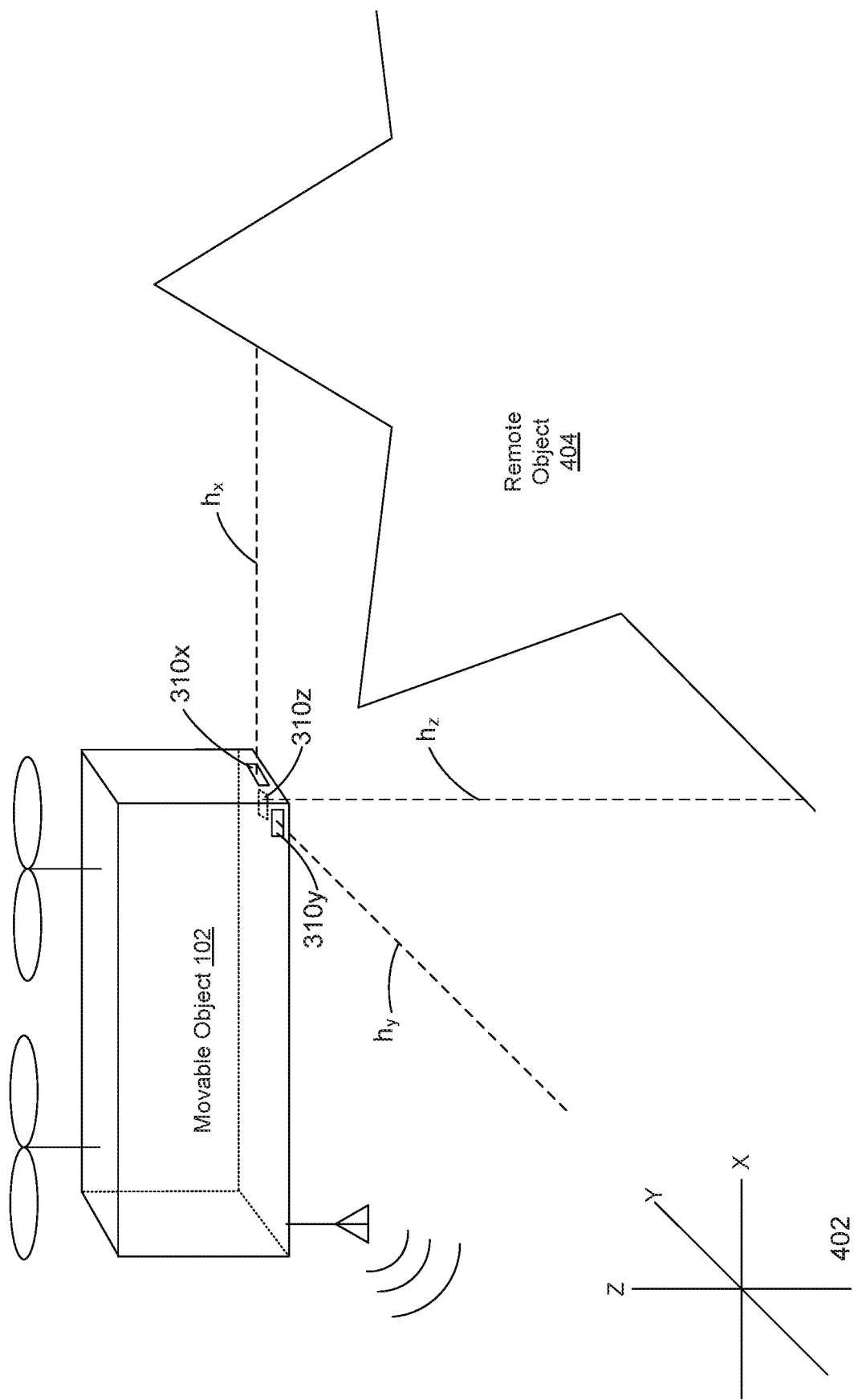
FIG. 4 illustrates a set of depth measurements acquired by depth sensors of the movable object, in accordance with some embodiments.

FIG. 4 illustrates a set of depth measurements acquired by the depth sensors 310 of the movable object 102, in accordance with some embodiments. In some embodiments, the depth sensors 310 include a first depth sensor 310x oriented along an x axis of a spatial coordinate system (e.g., as defined by the axes shown at 402), a second depth sensor 310y oriented along a y axis of the spatial coordinate system, and a third depth sensor 310z oriented along a z axis of the spatial coordinate system. The first depth sensor 310x acquires a depth measurement $h_x$ that indicates a distance from movable object 102 to a surface (e.g., the surface of remote object 404) along the x axis. The second depth sensor 310y acquires a depth measurement $h_y$ that indicates a distance from movable object 102 to a surface along the y axis. The third depth sensor 310z acquires a depth measurement $h_z$ that indicates a distance from movable object 102 to a surface along the z axis.

Figure 5:
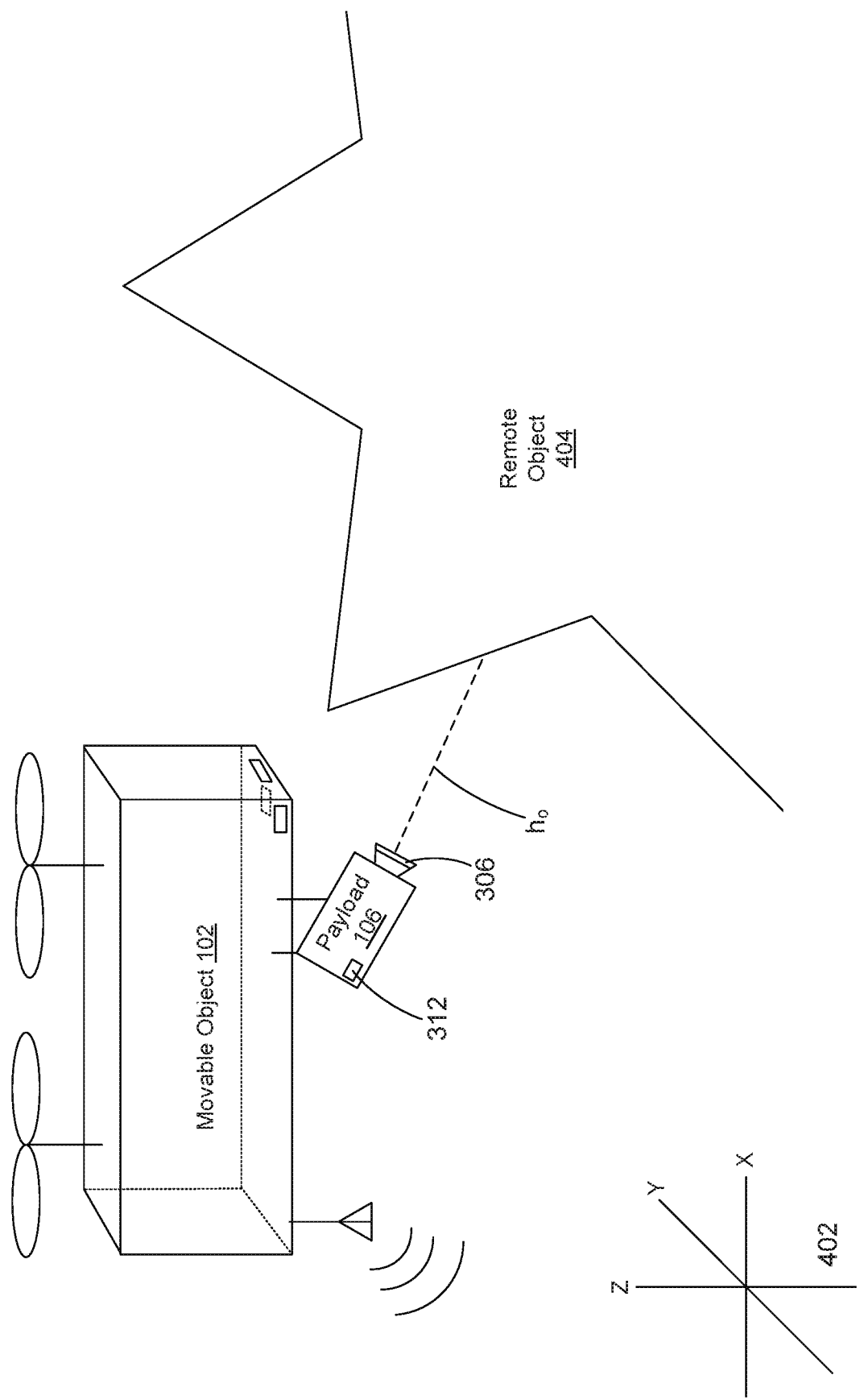
FIG. 5 illustrates an object distance between an optical device of an imaging device and a remote object.

FIG. 5 illustrates an object distance $h_o$ between the optical device 306 of the imaging device 302 and the remote object 404. In the illustrative example of FIG. 5, the imaging device 302 is (or is a component of) the payload 106. The orientation sensor 312 outputs orientation information of the imaging device 302 and/or the movable object 102 within the predefined spatial coordinate system 402. For example, the orientation information of the imaging device 302 indicates an orientation of a center axis of the optical device 306. The center axis of the optical device 306 is, e.g., an axis projecting from the center of the optical device 306 away from the imaging device 302 (e.g., in a direction opposite the path between the optical device 306 and the image sensor 304). The dotted line indicating object distance $h_o$ in FIG. 5 also illustrates the center axis of the optical device 306.

Figure 6:
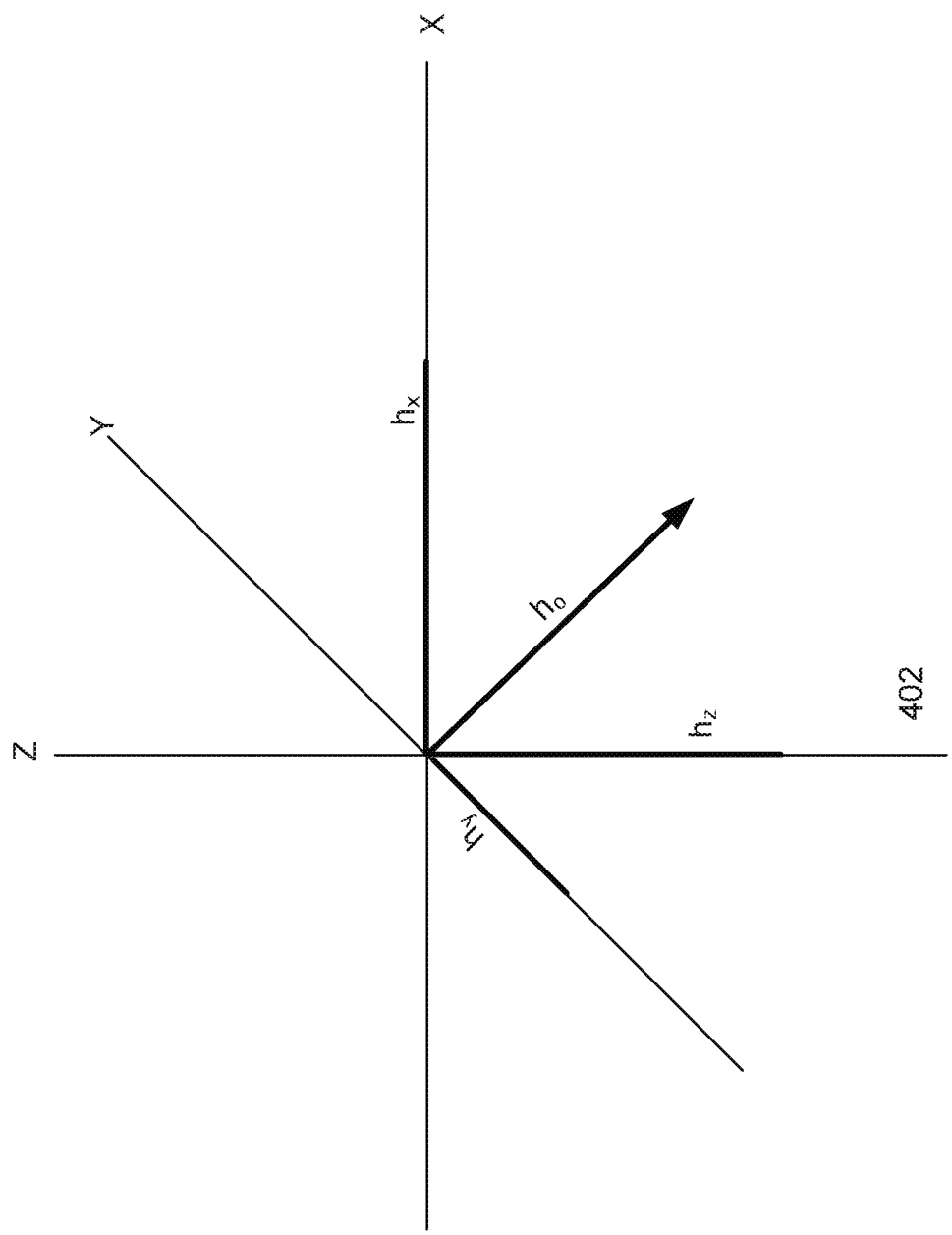
FIG. 6 illustrates the set of depth measurements in the context of a spatial coordinate system, in accordance with some embodiments.

FIG. 6 illustrates $h_x$, $h_y$, $h_z$, and $h_o$ in the context of spatial coordinate system 402. In some embodiments, to determine an estimated value of object distance $h_o$, equation (1) is used:

$$h_0 = hz - (hz - hx - (hy - hx)*\sin A1)*\sin C \qquad (1)$$

Figure 7:
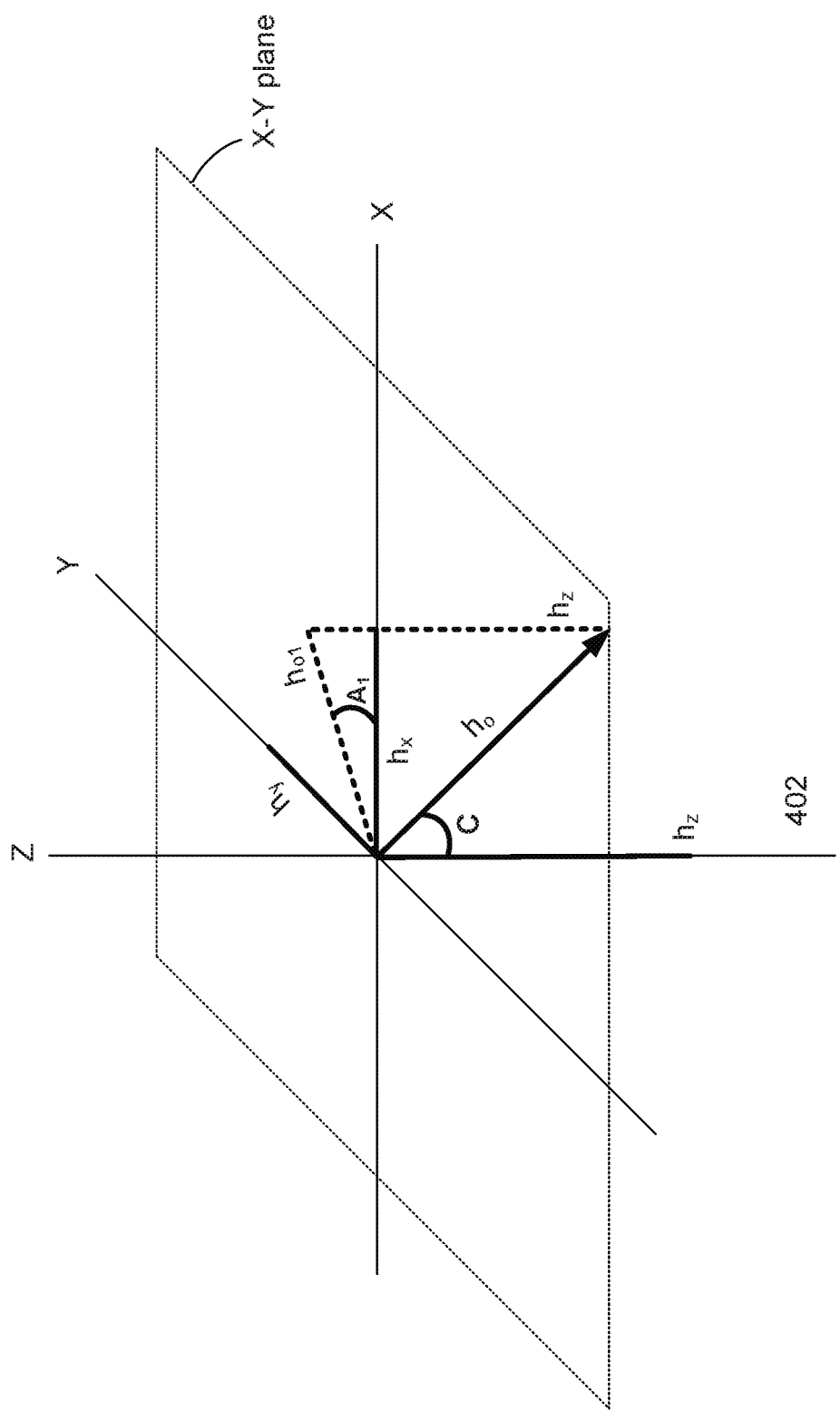
FIG. 7 illustrates variables used to determine an estimated value of an object distance, in accordance with some embodiments.

FIG. 7 illustrates angles ∠$A_1$ and ∠C. Angle ∠C is an angle between $h_o$ and $h_z$. Angle ∠C is determined using orientation information from the orientation sensor 312. Angle ∠$A_1$ is an angle between $h_{o1}$ and $h_x$, where $h_{o1}$ is a projection of $h_x$ onto the X-Y plane. Angle ∠$A_1$ is determined using orientation information from the orientation sensor 312.

The result of equation (1) is used to determine an image distance $d_{image}$. In some embodiments, when $d_{image}$ is determined, the optical device 306 is moved relative to the image sensor 304 such that the distance between the optical device 306 and the image sensor 304 is equal to $d_{image}$. For example, the image device actuator 308 moves the optical device 306 and/or the image sensor 304 in accordance with a signal received from, e.g., the processor(s) 202. In various situations, adjusting the distance between the optical device 304 and the image device 306 to an initial distance $d_{image}$ reduces the amount of time needed for an autofocus process to be performed.

In some embodiments, image distance $d_{image}$ is determined using equation(2):

$$d_{image} = \frac{1}{\frac{1}{f} - \frac{1}{h_o}} \qquad (2)$$

where f the focal length of optical device 306 and $h_o$ is the result of equation (1) (which is approximately the same as the distance between the optical device 306 and the remote object 404).

Figure 8A:
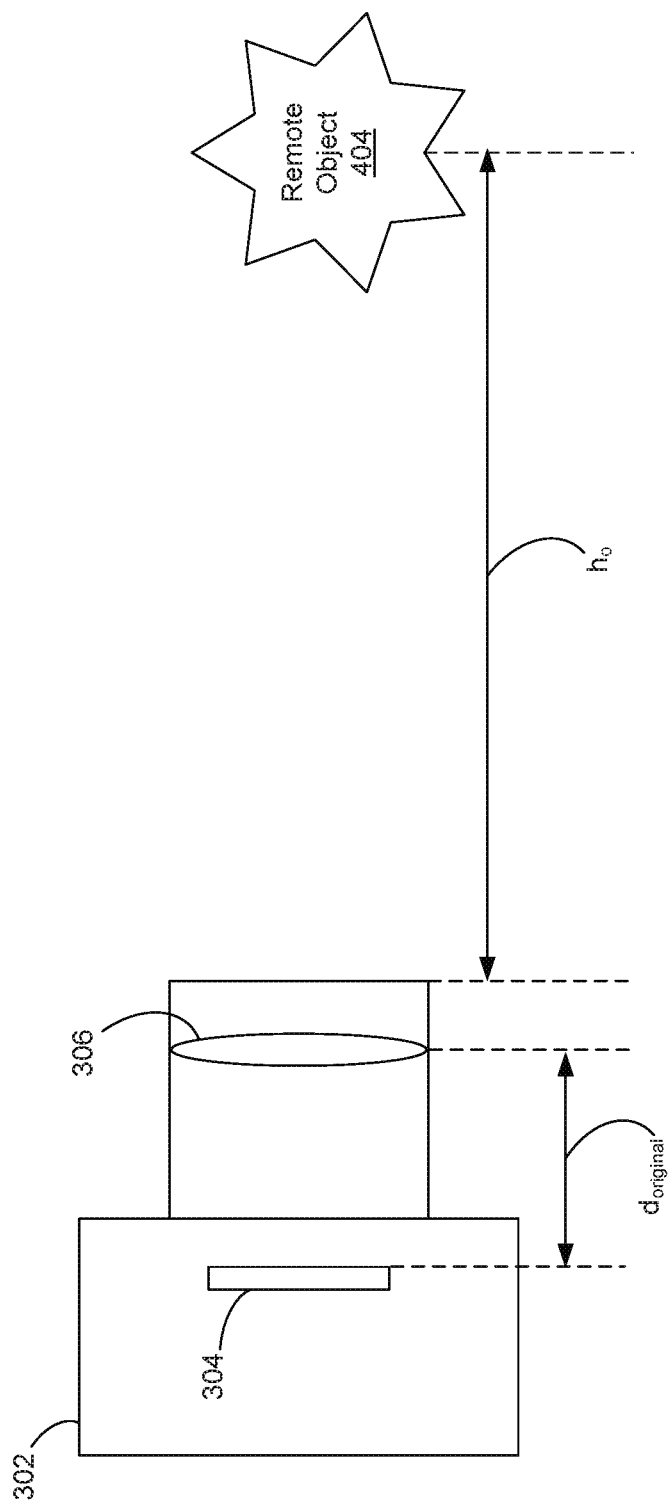
FIG. 8A illustrates an imaging device in which an optical device is at a first distance from an image sensor, in accordance with some embodiments.

FIG. 8A illustrates an imaging device 302 in which the optical device 306 is at a distance $h_o$ from the remote object 404 and at a first distance $d_{original}$ from the image sensor 304. When image distance $d_{image}$ is determined, optical device 306 is moved from the first distance $d_{original}$ from the image sensor 304 to second distance $d_{image}$ from the image sensor 304.

Figure 8B:
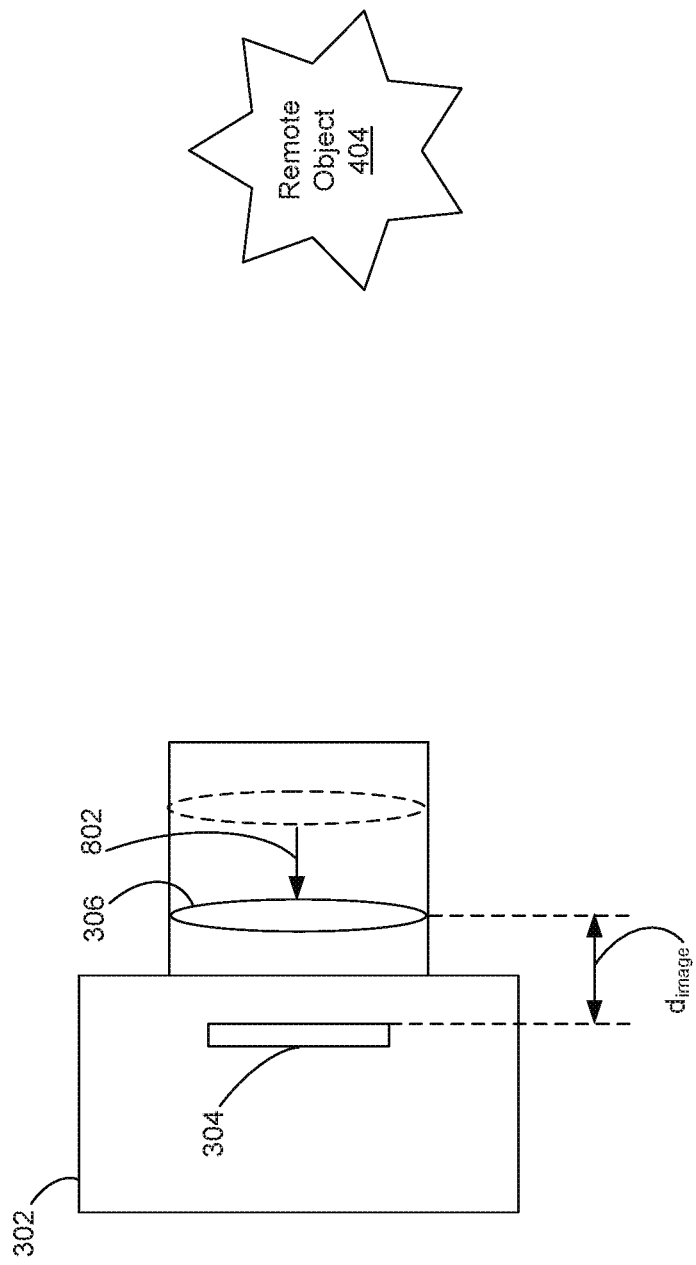
FIG. 8B illustrates an imaging device in which an optical device is at a second distance from an image sensor, in accordance with some embodiments.

FIG. 8B illustrates an imaging device 302 in which the optical device 306 has been moved (e.g., along a path indicated by the arrow 802) from an original position at distance $d_{original}$ from the image sensor 304 to determined image distance $d_{image}$ from the image sensor 304.

FIGS. 9A-9C are a flow diagram illustrating a method 900 for moving an optical device 306 relative to an image sensor 304, in accordance with some embodiments. The method 900 is performed at a device, such as the movable object 102, the imaging device 302, the control unit 108 and/or the computing device 110. For example, in some embodiments, instructions for performing the method 900 are stored in the memory 204 and executed by the processor(s) 202.

The device acquires (902), by one or more of the depth sensors 310, a set of depth measurements within a predefined spatial coordinate system 402. For example, the device uses depth sensors 310x, 310y, 310z to acquire a set of depth measurements $h_x$, $h_y$, $h_z$, respectively, as illustrated in FIG. 4. A respective depth measurement of the set of depth measurements indicates a distance from the imaging device 302 to an object. For example, a respective depth measurement of depth measurements $h_x$, $h_y$, $h_z$ indicates a distance from the imaging device 302 to, e.g., the remote object 404.

The device determines (904), by one or more of the orientation sensors 312, orientation information of the imaging device 302 within the predefined spatial coordinate system 402.

The device estimates (906) an object distance $h_o$ between the imaging device 302 and the object (e.g., the remote object 404) based on the set of depth measurements (e.g., $h_x$, $h_y$, $h_z$) and the orientation information. For example, the device uses equation (1) to estimate the object distance $h_o$. In some embodiments, one of the two measurements $h_x$, $h_y$ is optional for estimating the object distance $h_o$ (e.g., when the object is located on one of the two horizontal axes of the predefined spatial coordinate system 402.

The device moves (908) the optical device 306 from a first position to a second position according to the estimated object distance between the imaging device and the object and a focal length of the optical device. In some embodiments, the device determines an image distance $d_{image}$ based on the estimated object distance $h_o$ and the focal length f of the optical device. For example, the device uses equation (2) to determine the image distance $d_{image}$. The optical device 306 moves from the first position to the second position by the image distance $d_{image}$. For example, as illustrated in FIGS. 8A-8B, the device moves the optical device 306 along a path indicated by the arrow 802 from a first position at which the optical device 306 is a distance $d_{original}$ from image sensor 304 to a second position at which the optical device 306 is at a distance $d_{image}$ from image sensor 304.

In some embodiments, the one or more depth sensors include (912): a first depth sensor that has a first orientation along a first axis depth sensor 310x as illustrated in FIG. 4); a second depth sensor that has a second orientation along a second axis that is orthogonal to the first axis (e.g., depth sensor 310y as illustrated in FIG. 4); and a third depth sensor that has a third orientation along a third axis that is orthogonal to the first axis and the second axis (e.g., depth sensor 310z as illustrated in FIG. 4).

In some embodiments, estimating the object distance $h_o$ between the optical device 306 and the object (e.g., the remote object 404) includes (914): determining, using the orientation information (e.g., the output of the orientation sensor 312), a first angle between a center axis of the optical device 306 (e.g., an axis corresponding to the line illustrating $h_o$ in FIG. 5) and a first axis of the spatial coordinate system (e.g., the z-axis of the spatial coordinate system indicated by the axes 402). For example, the first angle is ∠ between $h_o$ and the z-axis as illustrated in FIG. 7. In some embodiments, estimating the object distance $h_o$ between the optical device 306 and the object (e.g., the remote object 404) further includes (914): determining, using the orientation information (e.g., the output of the orientation sensor 312), a second angle. In some embodiments, the second angle is an angle between: the center axis of the optical device 306 as projected onto a plane that is defined by a second axis and a third axis of the spatial coordinate system 402 (e.g., $h_{o1}$ is a projection of a center axis, $h_o$, onto the X-Y plane defined by the x axis and the y axis of the spatial coordinate system 402), and the second axis of the spatial coordinate system (e.g., the x-axis of the spatial coordinate system 402). For example, the second angle is ∠$A_1$ between $h_{o1}$ and the x-axis as illustrated in FIG. 7. In some embodiments, estimating the object distance $h_o$ between the optical device 306 and the object (e.g., the remote object 404) further includes (914): estimating the object distance $h_o$ based on the first angle ∠C, the second angle ∠$A_1$, and the set of depth measurements $h_x$, $h_y$, $h_z$. For example, equation (1) is used to estimate the object distance $h_o$.

In some embodiments, after moving the optical device to the second position (e.g., after the optical device 306 moves along the path indicated by the arrow 802 in 8B), the device moves (916) the optical device 306 from the second position to a third position according to an autofocus operation. In some embodiments, an image is captured by imaging device when the optical device 306 is at a first position (e.g., when optical device 306 is at a distance $d_{original}$ from image sensor 304, as shown in FIG. 8A), at the second position of the optical device 306 (e.g., when the optical device 306 is at a distance $d_{image}$ from the image sensor 304, as shown in FIG. 8B), and/or at the third position of the optical device 306. In some embodiments, data (e.g., contrast gradient data) from one or more of the captured images is used for an autofocus operation.

In some embodiments, the autofocus operation is a contrast autofocus operation (918). For example, the device determines, based on contrast gradients of images captured by the imaging device 302, a direction and/or amount by which to move the optical device 306 relative to the image sensor 304 to achieve a peak contrast gradient.

In some embodiments, a phase detection autofocus or other autofocus operation is used to determine a third position and subsequent positions of the optical device 306 relative to the imaging device 304.

In some embodiments, the one or more of the depth sensors 310 (e.g., 310x, 310y, 310z as illustrated in FIG. 4) include (920) at least one pressure sensor. In some embodiments, the at least one pressure sensor (922) is an ultrasonic sensor.

In some embodiments, the one or more of the orientation sensors 312 include (924) at least one accelerometer. For example, an orientation sensor 312 is an accelerometer that provides output usable to determine a three-dimensional orientation vector.

In some embodiments, acquiring, by the one or more of the depth sensors 310, a set of depth measurements (e.g., depth measurements $h_x$, $h_y$, $h_z$) includes: generating (926), by a signal generator (e.g., a speaker), a signal (e.g., an acoustic signal, such as an ultrasonic signal); and detecting (928) by the one or more depth sensors (e.g., a microphone), a reflection of the signal from the object (e.g., the remote object 404).

Many features of the present disclosure can be performed in, using, or with the assistance of hardware, software, firmware, or combinations thereof. Consequently, features of the present disclosure may be implemented using a processing system. Exemplary processing systems (e.g., processor(s) 202) include, without limitation, one or more general purpose microprocessors (for example, single or multi-core processors), application-specific integrated circuits, application-specific instruction-set processors, field-programmable gate arrays, graphics processors, physics processors, digital signal processors, coprocessors, network processors, audio processors, encryption processors, and the like.

Features of the present disclosure can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 204) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystem (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems, and execution environments/containers.

Communication systems as referred to herein (e.g., the communication system 206) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RE circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO). HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE102.11ax, IEEE102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), spread spectrum technology such as FASST or DESST, or any other suitable communication protocol, including communication protocols not yet developed as of the filing date of this document.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method for moving an optical device of an imaging device comprising:
    acquiring, by one or more depth sensors, one or more depth measurements within a predefined spatial coordinate system, each of the one or more depth measurements indicating a distance from the imaging device to an object within the predefined spatial coordinate system,
    wherein the one or more depth sensors comprise at least one of:
        a first depth sensor that has a first orientation along a first axis of the spatial coordinate system,
        a second depth sensor that has a second orientation along a second axis of the spatial coordinate system that is orthogonal to the first axis, or
        a third depth sensor that has a third orientation along a third axis of the spatial coordinate system that is orthogonal to the first axis and the second axis;
    determining, by one or more orientation sensors, orientation information of the imaging device within the predefined spatial coordinate system;
    estimating an object distance between the imaging device and the object based on the one or more depth measurements and the orientation information, including:
        determining, using the orientation information, a first angle between a center axis of the optical device and the first axis;
        determining, using the orientation information, a second angle between:
            a projection of the center axis of the optical device on a plane defined by the second axis and the third axis, and
            the second axis;
        estimating the object distance based on the first angle, the second angle, and the one or more depth measurements; and
    moving the optical device from a first position to a second position according to the object distance and a focal length of the optical device.

2. The method of claim 1, further comprising, after moving the optical device to the second position:

moving the optical device from the second position to a third position according to an autofocus operation.

3. The method of claim 2, wherein the autofocus operation comprises a contrast autofocus operation.

4. The method of claim 1, wherein the one or more depth sensors comprise at least one of a pressure sensor, an infrared sensor, an ultrasonic sensor, a stereo camera, or a time-of-flight camera.

5. The method of claim 1, wherein acquiring, by the one or more depth sensors, the one or more depth measurements comprises:
generating, by a signal generator, a signal; and
detecting, by the one or more depth sensors, a reflection of the signal from the object.

6. The method of claim 1, wherein the one or more orientation sensors comprise at least one of an accelerometer, a magnetometer, a potentiometer, a Hall sensor, or a gyroscope.

7. An unmanned aerial vehicle (UAV) comprising:
a propulsion system;
an imaging device comprising an optical device;
one or more depth sensors configured to acquire one or more depth measurements within a predefined spatial coordinate system, each of the one or more depth measurements indicating a distance from the imaging device to an object,
wherein the one or more depth sensors comprise at least one of:
a first depth sensor that has a first orientation along a first axis of the spatial coordinate system,
a second depth sensor that has a second orientation along a second axis of the spatial coordinate system that is orthogonal to the first axis, or
a third depth sensor that has a third orientation along a third axis of the spatial coordinate system that is orthogonal to the first axis and the second axis;
one or more orientation sensors configured to determine orientation information of the imaging device within the predefined spatial coordinate system; and
one or more processors coupled to the propulsion system, the one or more depth sensors, the one or more orientation sensors, and the imaging device, and configured to:
estimate an object distance between the imaging device and the object based on the one or more depth measurements and the orientation information;
determine, using the orientation information, a first angle between a center axis of the optical device and the first axis;
determine, using the orientation information, a second angle between:
a projection of the center axis of the optical device on a plane defined by the second axis and the third axis, and
the second axis;
estimate the object distance based on the first angle, the second angle, and the one or more depth measurements; and
control the optical device to move from a first position to a second position according to the object distance and a focal length of the optical device.

8. The UAV of claim 7, wherein the one or more processors are further configured to, after the optical device moves to the second position:

control the optical device to move from the second position to a third position according to an autofocus operation.

9. The UAV of claim 8, wherein the autofocus operation comprises a contrast autofocus operation.

10. The UAV of claim 7, wherein the one or more depth sensors comprise at least one of a pressure sensor, an infrared sensor, an ultrasonic sensor, a stereo camera, or a time-of-flight camera.

11. The UAV of claim 7, wherein the one or more depth sensors are configured to acquire the one or more depth measurements by detecting a reflection of a signal from the object, the signal being generated by a signal generator.

12. The UAV of claim 7, wherein the one or more orientation sensors comprise at least one of an accelerometer, a magnetometer, a potentiometer, a Hall sensor, or a gyroscope.

13. A system for moving an optical device of an imaging device comprising:
one or more depth sensors configured to acquire one or more depth measurements within a predefined spatial coordinate system, each of the one or more depth measurements indicating a distance from the imaging device to an object,
wherein the one or more depth sensors comprise at least one of:
a first depth sensor that has a first orientation along a first axis of the spatial coordinate system,
a second depth sensor that has a second orientation along a second axis of the spatial coordinate system that is orthogonal to the first axis, or
a third depth sensor that has a third orientation along a third axis of the spatial coordinate system that is orthogonal to the first axis and the second axis;
one or more orientation sensors configured to determine orientation information of the imaging device within the predefined spatial coordinate system; and
one or more processors coupled to the one or more depth sensors, the one or more orientation sensors, and the imaging device, and configured to:
estimate an object distance between the imaging device and the object based on the one or more depth measurements and the orientation information;
determine, using the orientation information, a first angle between a center axis of the optical device and the first axis;
determine, using the orientation information, a second angle between:
a projection of the center axis of the optical device on a plane defined by the second axis and the third axis, and
the second axis;
estimate the object distance based on the first angle, the second angle, and the one or more depth measurements; and
control the optical device to move from a first position to a second position according to the object distance and a focal length of the optical device.

14. The system of claim 13, wherein the one or more processors are further configured to, after the optical device moves to the second position:
control the optical device to move from the second position to a third position according to an autofocus operation.

* * * * *